United States Patent [19]

Gibson et al.

[11] Patent Number: 5,477,618
[45] Date of Patent: Dec. 26, 1995

[54] SAND CORE DIMENSION CHECKING APPARATUS

[76] Inventors: Stephen P. Gibson, 14112 Henry Ruff, Livonia, Mich. 48154; Robert A. Kook, 37214 Ilene, Clinton Township, Macomb County, both of Mich. 48036

[21] Appl. No.: 237,454

[22] Filed: May 3, 1994

[51] Int. Cl.$^6$ .................................................. G01B 5/207
[52] U.S. Cl. .............................. 33/545; 33/552; 33/557; 33/600; 164/151.2
[58] Field of Search .................... 33/545, 546, 551, 33/552, 555, 557, 560, 548, 600; 164/150.1, 151.2

[56] References Cited

U.S. PATENT DOCUMENTS

| | | | |
|---|---|---|---|
| 2,727,311 | 12/1955 | Aller et al. | 33/548 X |
| 3,061,937 | 11/1962 | Aviles et al. | 33/555 |
| 4,221,053 | 9/1980 | Bobel, II et al. | 33/552 |
| 4,545,420 | 10/1985 | Christmann et al. | |
| 4,831,741 | 5/1989 | Sogoian | 33/502 |
| 4,953,306 | 9/1990 | Weckenmann et al. | 33/552 X |
| 4,986,004 | 1/1991 | Hartmann et al. | 33/552 X |
| 5,119,881 | 6/1992 | Cagle | |
| 5,148,377 | 9/1992 | McDonald | |

FOREIGN PATENT DOCUMENTS

| | | | |
|---|---|---|---|
| 59-37761 | 9/1984 | Japan | 164/150.1 |
| 2-299766 | 12/1990 | Japan | 164/151.2 |
| 2-299765 | 12/1990 | Japan | 164/151.2 |

*Primary Examiner*—Alvin Wirthlin
*Attorney, Agent, or Firm*—Basile and Hanlon

[57] ABSTRACT

A frame has sensors mounted thereon for engaging selected portions of a sand core and generating signals proportional to sensed dimensions of the sand core. A control unit compares the sensor signals with a zero reference dimension and a dimensional tolerance range for each sensed dimension of the sand core and generates an indication of acceptable/unacceptable core dimensions. A computer monitor and/or light panel is activated by the control unit and provides a visual indication for each sensed dimension by means of numeric data, color, directional arrows or distinct illuminated lights of an acceptable/unacceptable and even a marginally acceptable sand core.

18 Claims, 7 Drawing Sheets

SAND CORE DIMENSION CHECKING APPARATUS

BACKGROUND OF THE INVENTION

1. Field of the Invention

The present invention relates, in general, to sand cores for casting manufactured parts and, more specifically, to dimension checking devices.

2. Description of the Art

A variety of manufactured parts or workpieces are cast from iron or other metal. In particular, a block for an internal combustion engine, along with the corresponding intake and exhaust manifolds, water jacket, etc., is commonly cast from iron or aluminum. Such engine blocks are of complex design with numerous internal bores and passages for cylinders, coolant flow passages, spark plugs, injectors, etc. Core elements, such as sand cores, are commonly employed to form such passageways in an engine block. Such core elements are themselves formed in a mold from casting sand and suitable resin binders.

In a multi-cylinder internal combustion engine, individual core elements representing the passages for one or two cylinders each, as well as additional core elements containing one or more intake and/or exhaust passageways, water jacket portions, etc., are interconnected and built up onto each other in a stack to form a sand core for a complete block. The complete sand core is then placed in another mold into which molten metal is poured to cast the metal about the sand core. After the metal solidifies, the core elements are removed thereby leaving cylinders, air intake and exhaust passageways, and coolant flow paths in the cast engine block.

Since the complete core for an engine block and associated components is formed of a number of individual core elements, misalignment of the assembled core elements, inaccurately molded elements, loosely interconnected elements or angularly offset elements frequently occur. The use of such a misaligned core results in a cast engine block which does not meet design specifications and, therefore, must be scrapped. In the case of an engine block, this is extremely costly.

It would be more effective from a cost standpoint to provide an easy means for checking the alignment and dimensional arrangement of individual core elements of a complete sand core prior to casting a workpiece thereabout. Thus, it would be desirable to provide a sand core dimension checking apparatus which quickly and easily checks the position of the individual core elements of a complete sand core for proper alignment, spacing, overall length, angular arrangement, etc. It would also be desirable to provide a sand core dimension checking apparatus which is capable of checking the dimensional location of various parts of a complete core formed of individual, interconnected core elements and comparing the measured dimensions with predetermined acceptable manufacturing dimensions or tolerances to provide an indication of an acceptable or unacceptable sand core prior to the use of the sand core in a casting operation.

SUMMARY OF THE INVENTION

The present invention is a sand core dimension checking apparatus which quickly and easily measures selected dimensions of a complete sand core formed of individual, interconnected core elements and compares the measured dimensions with preset manufacturing tolerances to provide an indication of an acceptable or unacceptable sand core.

The apparatus generally includes a frame for supporting individual dimension sensor means. Means are mounted on the frame for locating the frame with respect to a coordinate reference position on the sand core. Each sensor means has a zero reference point from which measured dimensions are determined. Each sensor means contacts a portion of the sand core and provides an electrical signal proportional to a sensed dimensional difference of the sand core with respect to the zero reference point for each measured portion. A control means receives the signals from the sensor means and compares the dimensional difference represented by each signal with respect to the respective zero reference point and generates signals to an indicator means to indicate acceptable or unacceptable sensed dimensions.

The control means also determines the direction of dimensional difference of each sensed dimension with respect to the zero reference point of each sensor means. The indicator means, in response to signals from the control means, provides an indication of the direction of dimensional difference or shift of each dimension sensed by each sensor means. The indicator means may comprise a video display or monitor for displaying numeric values corresponding to the measured dimensional differences from each sensor means as well as the direction of dimensional shift of each measured dimension from the respective zero reference point. The control means is also capable of illuminating the indicator means with distinct colors corresponding to an acceptable or unacceptable sensed dimension with respect to preset dimensional tolerances for each dimension.

The indicator means may alternately, or in addition to the video display monitor described above, include a light panel which includes a plurality of individual, illuminatable lights, at least one light corresponding to each sensed dimension. Preferably, two lights corresponding respectively to an acceptable or unacceptable measured dimension are provided for each measured dimension of the sand core. Alarm means, either visual and/or audible, may be actuated by the control means when any of the sensed dimensions is outside of the preset dimensional tolerance range.

In one exemplary embodiment, the frame comprises a central leg and one end leg connected thereto. The locating means is mounted on the one end leg for engaging and locating the frame with respect to a coordinate measuring reference point on the sand core. Means are mounted in the locating means for generating electrical signals indicative of a secure contact with the sand core.

In this embodiment, the frame further comprises a second end leg and means, mounted on the frame, for rotatably attaching the second end leg to the frame. Locating means are also mounted on the second end leg for engaging and locating a portion of the sand core. A first sensor is mounted on the frame and is responsive to rotation of the rotatably attaching means for generating an electrical signal proportional to the degree of rotation of the rotatably attaching means as the locating means seats on the sand core. Preferably, the rotatably attaching means comprises a bracket slidably mounted on the central leg of the frame. A shaft is rotatably mounted in collars formed on the bracket and has an end fixedly connected to the second end leg.

A second sensor means is coupled between the bracket and the central leg of the frame for sensing and generating an output signal proportional to the amount of transverse movement of the bracket with respect to a zero reference point on the longitudinal axis of the frame.

An extensible and retractable sensor frame is movably mounted on the central leg of the frame. Means are mounted on the frame for extending and retracting the sensor frame. At least one third sensor is mounted on the sensor frame and engages the sand core when the sensor frame is in the extended position and generates an output signal proportion to a dimension of the engaged portion of the sand core with respect to a zero reference point of the third sensor. Preferably, a plurality of third sensors are mounted on the sensor frame, with one being disposed along the longitudinal axis of the frame and two being spaced outward on opposite sides from the longitudinal axis.

In a second embodiment, the frame includes a central leg and two depending end legs. The locator means are mounted on each of the end legs for engaging the sand core and locating the frame with respect to the core in a predetermined coordinate measuring reference position. First sensor means are mounted on the frame for engaging a selected portion of the core and generating a signal representative of a dimension of a portion of the core. A second frame is movably mounted within the first frame and is movable from a first normal position to a second lowered position bringing second sensor means mounted thereon into engagement with the core. A third sensor means is mounted on the frame and engages a bore in the core. The third sensor means generates two signals proportional to the X and Y axis position of the bore with respect to a zero bore reference dimension.

The present sand core dimension checking apparatus provides a unique solution to the problem of generating out-of-tolerance cast manufactured parts. The apparatus provides a dimensional check of a sand core prior to the use of a sand core to cast a manufactured part. If a dimensional error or an out-of-tolerance condition is detected by the apparatus, only the sand core need be scrapped or modified to bring it into tolerance. The present invention is used particularly advantageously with a core formed of a plurality of interconnectable core elements. The present apparatus provides a check of the total length, angular, end-to-end alignment, vertical positional alignment, etc., of the interconnected core elements.

The present apparatus can be individually designed as separate fixtures for use with each stage of a sand core assembly or buildup. The apparatus also provides a visual indication of each sensed sand core dimension and automatically computes whether the sensed dimension is different from a zero reference point for each sensed dimension and is acceptable or unacceptable, that is, within or outside of a selected manufacturing tolerance range for each measured dimension of the sand core. Such indication is provided on a computer monitor in an easy readable form and/or via a separate light panel including acceptable/unacceptable lights for each sensed dimension on the sand core. In a preferred application, the control unit of the apparatus displays the dimensional difference, the direction of dimensional difference from a zero reference point, as well as an indication, such as by distinct colors on the monitor or by illuminating different colored lights on the light panel, whether the measured dimension is acceptable or unacceptable with respect to predetermined manufacturing tolerance dimensions.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
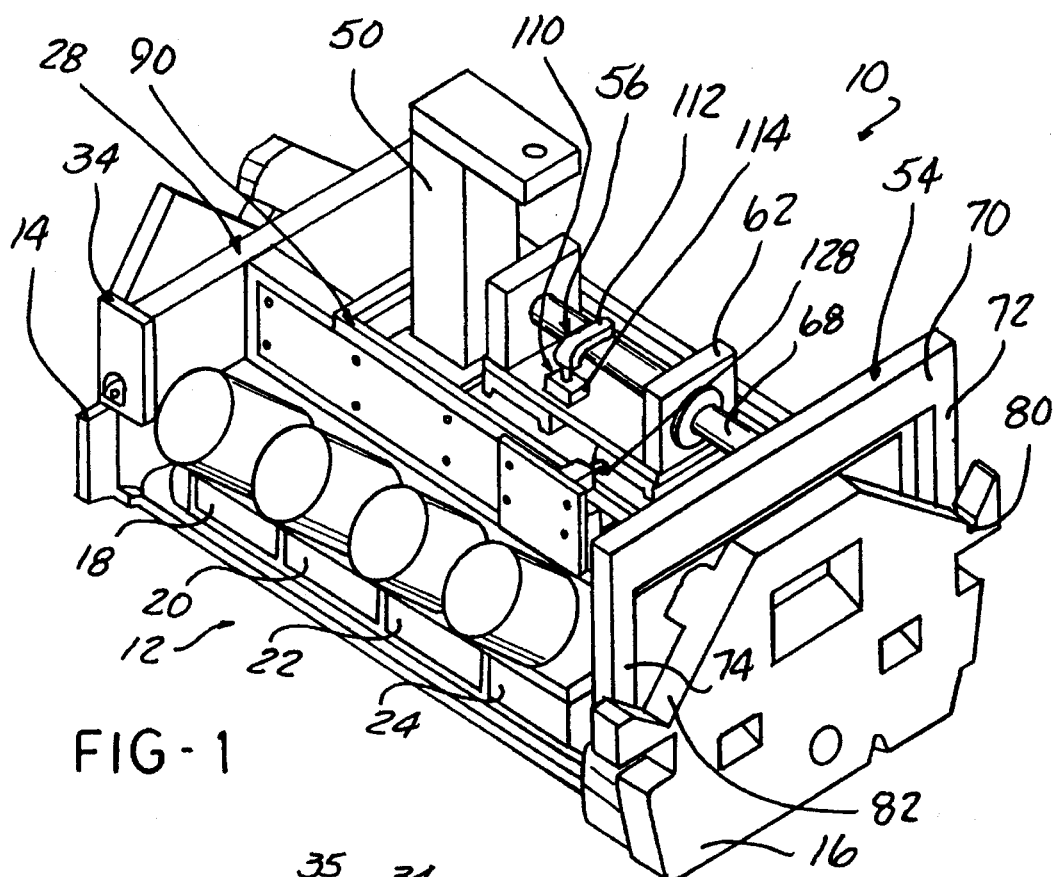
FIG. 1 is a perspective view of a first embodiment of the apparatus of the present invention shown mounted on an engine block sand core.

Referring now to FIG. 1, there is depicted a first embodiment of an apparatus 10 for checking the dimensions of a sand core 12. By way of example only, the sand core 12 is depicted as being in the form of a sand core used to cast an internal combustion engine block. As is conventional, the sand core 12 is built up of interconnected core elements which include, by way of example only, first and second end member elements 14 and 16 and individual cylinder core elements 18, 20, 22 and 24. The cylinder elements 18, 20, 22 and 24 may include one or two cylinders in each element. The individual elements 16, 18, 22 and 24 are interconnected into a complete sand core by means of integrally formed projections and recesses, not shown, on each element which interconnect with adjacent elements.

The apparatus 10 includes a frame 28 formed of a first central leg 30 and a second end leg 32 generally transverse to the central leg 30 and joined to one end of the central leg 30 by suitable means, such as by fasteners, welding, etc. In this embodiment, the frame 28 has a generally planar, T-shape. Locating means 34 are mounted on opposite ends of the end leg 32. The locating means 34 is preferably in the form of a locator block 35 having an inverted V-shaped notch 36 at one end which seats on a mating projection on the sand core 12. The notch 36 and mating projection on the sand core 12 defines a coordinate reference measuring position which seats the frame 10 on the sand core 12 in a predetermined coordinate reference position both laterally and longitudinally on the sand core 12.

Locating transducers denoted generally by reference numbers 40 and 42 are mounted in bores in each locator block 35 and have a sensor end 46 extending outward from the locator block 35 which engages the mating projection on the sand core 12 in the case of the transducer 40 and an adjacent surface on the first end member 14 in the case of transducer 42. Similar transducers 40 and 42 are mounted in the opposite locator block 35. The transducers 40 and 42 provide an indication that the apparatus 10 has been mounted in the desired coordinate reference measuring position on the sand core 12. This indication is obtained by output signals from all four transducers 40 and 42 on the two locator blocks 35. The absence of any one signal from one of the transducers 40 and 42 is an indication that the apparatus 10 is not positioned in the correct reference position on the sand core 12 and that further adjustment is necessary.

Means are provided for moving the apparatus 10 into position on the sand core 12. By way of example only, a hanger 50 in the form of a generally inverted L-shaped bracket is securely attached to the central leg 30 of the frame 28 by means of fasteners, welding, etc. An aperture 52 is formed in the hanger 50 and receives an eye bolt, not shown, for connecting the hanger 50 to a suitable hoist or lifting device. This enables an operator to easily bring the apparatus 10 into position on the sand core 12 for checking the dimensions of the sand core 12 as described hereafter.

An end frame 54 is rotatably mounted to the end of the central leg 30 of the frame 28 opposite from the end leg 32. A bracket 56 includes a base 58 and a pair of spaced collars 60 and 62, each of which has a bearing 64 mounted in an aligned aperture formed therein. A pair of slides 66 are mounted to the bottom surface of the base 58 and to the top surface of the central leg 30 of the frame 28. The slides 66 may be any suitable slide apparatus, such as a ball slide, Model No. L-31, sold by Automation Gages, Inc. of Rochester, N.Y. The slides 66 allow free sliding transverse movement of the bracket 56 with respect to a longitudinal axis extending along the central frame leg 30.

Figure 2:
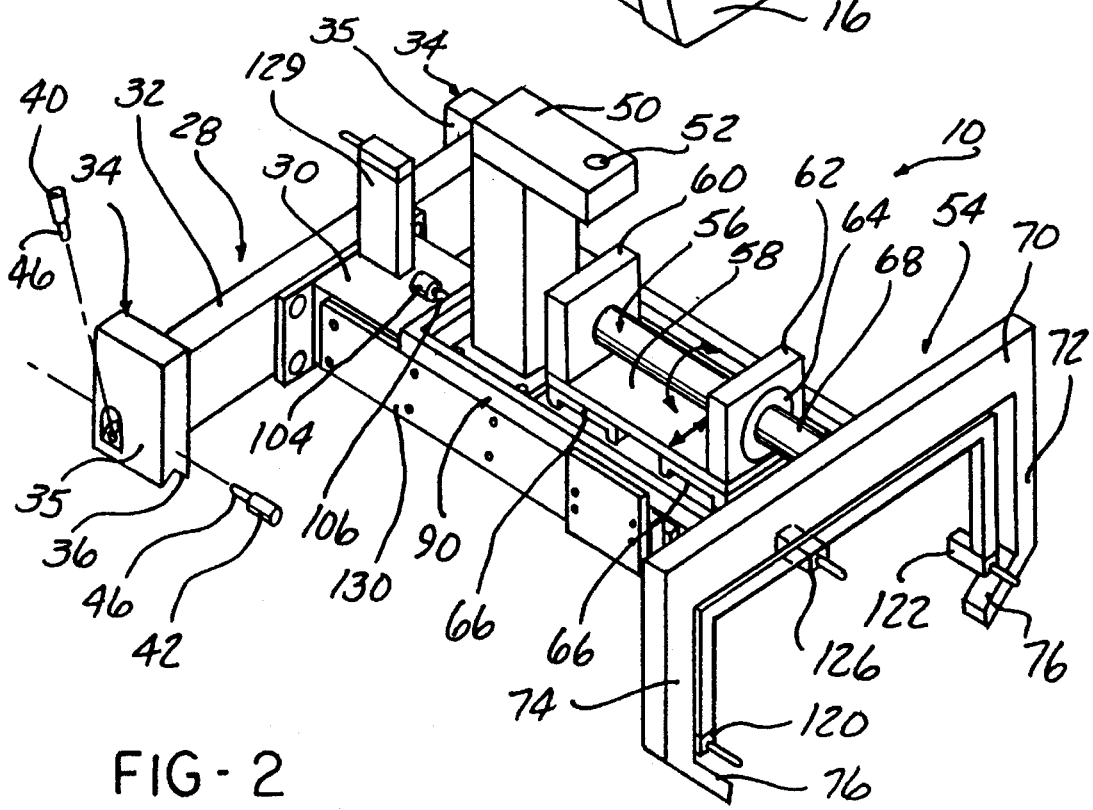
FIG. 2 is a perspective view of the apparatus shown in FIG. 1.

A generally circular cross section shaft or shaft 68 is rotatably mounted in the bearings 64 in the collars 60 and 62. An outer end of the shaft 68 is fixed to the end frame 54. As shown in FIGS. 1 and 2, the end frame 54 includes a central leg 70 fixedly joined to the shaft 68 and extending transverse to the longitudinal axis of the shaft 68, and a pair of depending side legs 72 and 74 which are integrally joined to the central leg 70 and extend downward therefrom in the orientation shown in FIG. 2.

Locating means 76, preferably in the form of angularly disposed fingers, are formed as extensions of the extreme end of the depending leg 72 and 74. The fingers 76 are shaped and angled so as to securely engage notches 80 and 82, shown in FIG. 1, in the second end member element 16 of the sand core 12 to locate the end frame 54 with respect to the second end member element 16 of the sand core 12. Any angular twist or angular misalignment of the second end member element 16 with respect to the first end member element 14 of the sand core 12 will cause the end frame 54 to twist about the axis of the shaft 68 thereby causing rotation of the shaft 68. This rotation is sensed by a suitable sensor described hereafter.

Figure 3:
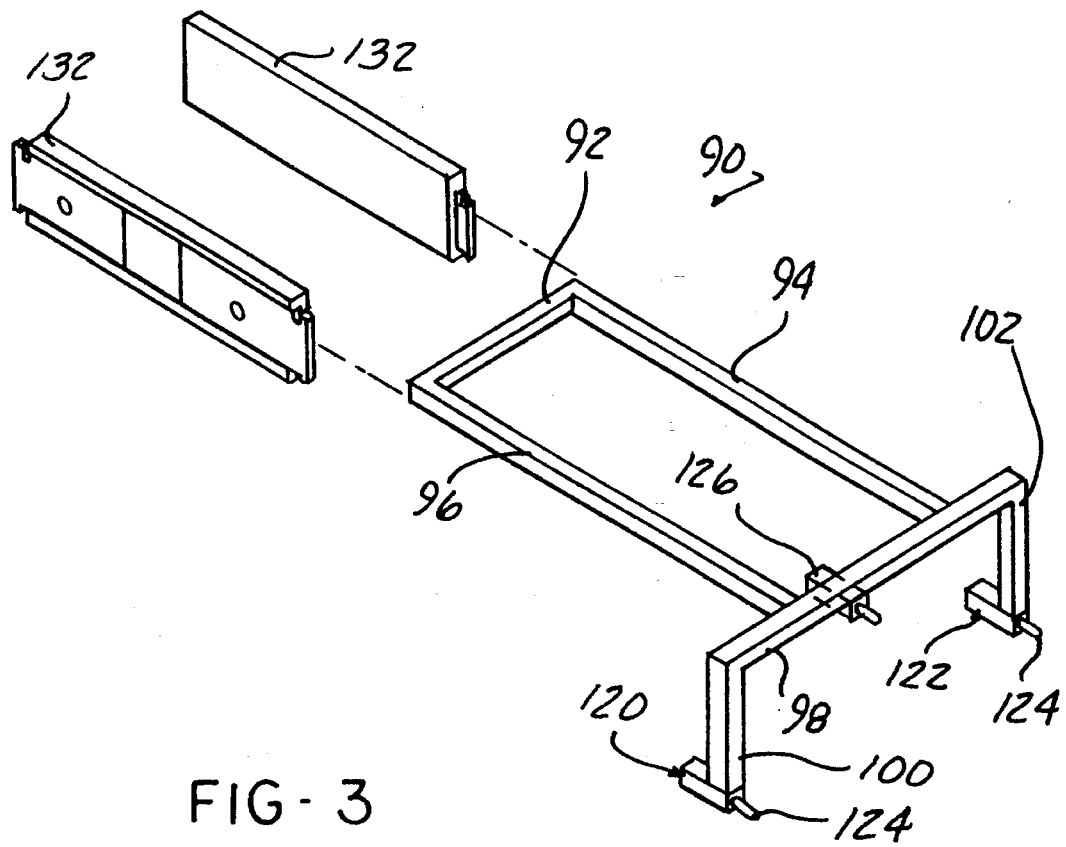
FIG. 3 is an exploded, perspective view of the movable frame shown in FIG. 2.

The apparatus 10 also includes an extendable and retractable frame denoted generally by reference number 90 in FIGS. 1, 2 and 3. As shown more clearly in FIG. 3, the extensible and retractable frame 90 includes a first end leg 92 which is joined at opposite ends to a pair of spaced side legs 94 and 96. The opposite ends of the side legs 94 and 96 are fixedly joined to a second end leg 98 from which a pair of depending legs 100 and 102 are joined and extend. The frame 90 is movably disposed on the central frame leg 30 by means of slides 132. The slides 132, shown in FIG. 3, are mounted on the precision rails 130 secured to opposite sides of the central leg 30 of the frame 28 and provide a sliding mounting for the frame legs 94 and 96 of the extensible and retractable frame 90. The frame 90 is moved between extended and retracted positions by a suitable moving means, such as a solenoid 104 having an extensible and retractable plunger 106 extending from one end thereof and fixedly joined to the first end leg 92 of the frame 90. Activation of the solenoid 104, as described hereafter, causes the plunger 106 and the frame 90 to extend from a first or retracted position, shown in FIG. 1, to a second or extended position in which the sensor means mounted on the frame 90, as described hereafter, are brought into engagement with selected portions of the sand core 12.

As shown in FIG. 1, a first sensor 110 is mounted on the bracket 56 for sensing the amount of angular rotation of the shaft 68. An arm 112 is fixedly attached to the shaft 68 and extends laterally outward therefrom. A linear displacement sensor 114, such as a 9600 Series Spring Return Linear Position Sensor Module sold by Duncan Electronics, Costa Mesa, Calif., is mounted on the base 58 of the bracket 56 and has an actuator extending outward therefrom which engages the arm 112. The sensor 114 generates an electrical output signal proportional in magnitude to the amount of displacement of the actuator caused by movement of the arm 114 due to rotation of the shaft 68.

As shown in FIGS. 1 and 3, a pair of second sensors 120 and 122 are fixedly mounted at the ends of the depending legs 100 and 102 of the extensible and retractable frame 90. The sensors 120 and 122 are also preferably linear displacement sensors having an actuator 124 extending outward therefrom which engages a selected portion of the sand core 12 when the frame 90 is moved into its extended position. In the present example, the sensors 120 and 122 provide a measurement of the position of the outer ends of the second end member element 16 with respect to the corresponding ends of the first end member element 14 of the sand core 12. The sensors 120 and 122 act as variable resistors and provide a variable output resistance proportional to the amount of displacement of the actuator when it engages the sand core 12.

A third sensor 126 is also mounted on the second end leg 98 of the frame 90 and contacts a center point of the second end member element 16. This provides a dimensional check of the total dimension or spacing between the end member elements 14 and 16 along the longitudinal axis of the complete sand core 12.

A transverse sensor 128 is mounted to one of the precision rails 130 attached to a side of the central leg 30, as shown in FIG. 1. The sensor 128, which preferably is also a linear displacement sensor, has an actuator extending outward therefrom which engages one of the slides 66. Any transverse movement of the slides 66 from a normal centered position along the longitudinal axis of the frame leg 30 caused by misalignment of the second end member element 16 with respect to the first end member element 14 will cause a sideways translation or movement of the entire bracket 58. This dimensional change will be detected by the sensor 128 which generates an output signal whose magnitude is proportional to the amount of dimensional change or difference from the center position of the bracket 58.

Another sensor 129 is mounted on the leg 30 of the frame 28 and includes an actuator which engages the first end member element 14 to locate the position of the element 14.

In operation, the apparatus 10 will initially be lowered by means of the hoist, not shown, onto the assembled sand core 12. The locators 34 will provide appropriate signals indicating when the apparatus 10 is positioned in the desired coordinate reference measuring position on the sand core 12.

Figure 4:
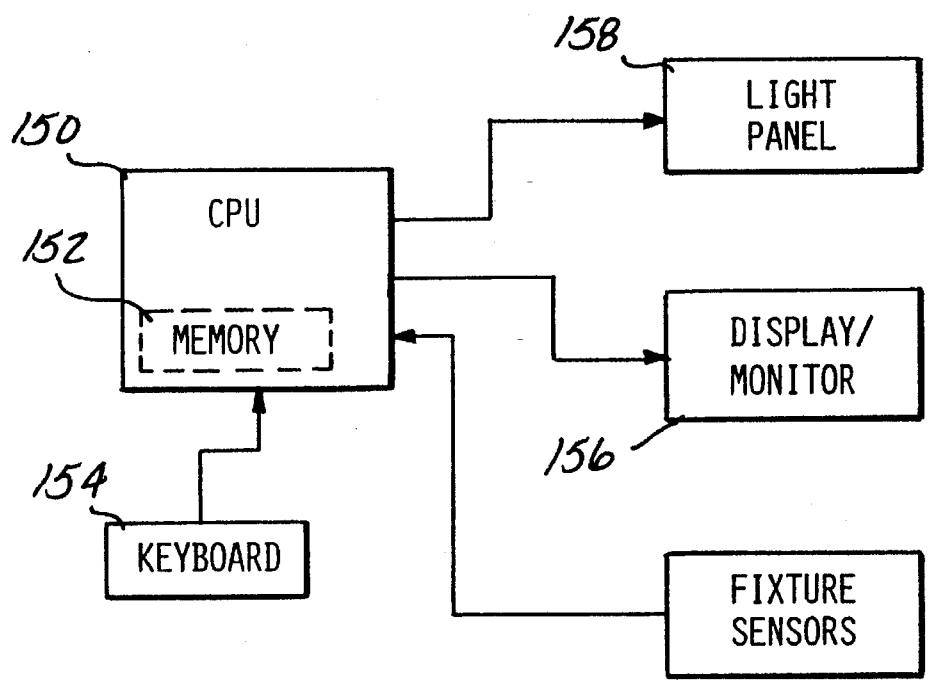
FIG. 4 is a block diagram of the control unit of the apparatus shown in FIG. 1.

The apparatus 10 includes a control means denoted generally by reference number 150 in FIG. 4 which controls the operation of the extendable/retractable frame 90 as well as receiving inputs from the various sensors and controlling an indicator means to provide an indication of any measured dimensional differences. The control means 150 preferably comprises a central processing unit, such as a conventional microprocessor, which executes a control program stored in a memory 152. The memory 152 is also operable for storing the measured dimensional data as measured by the sensors and described hereafter. Input to the central processing unit 150 is a conventional keyboard 154 as well as the inputs from the various sensors on the apparatus 10. The central processing unit 150 generates output signals to the indicating means, such as a conventional video display/monitor 156 and/or a light box 158.

Figure 5:
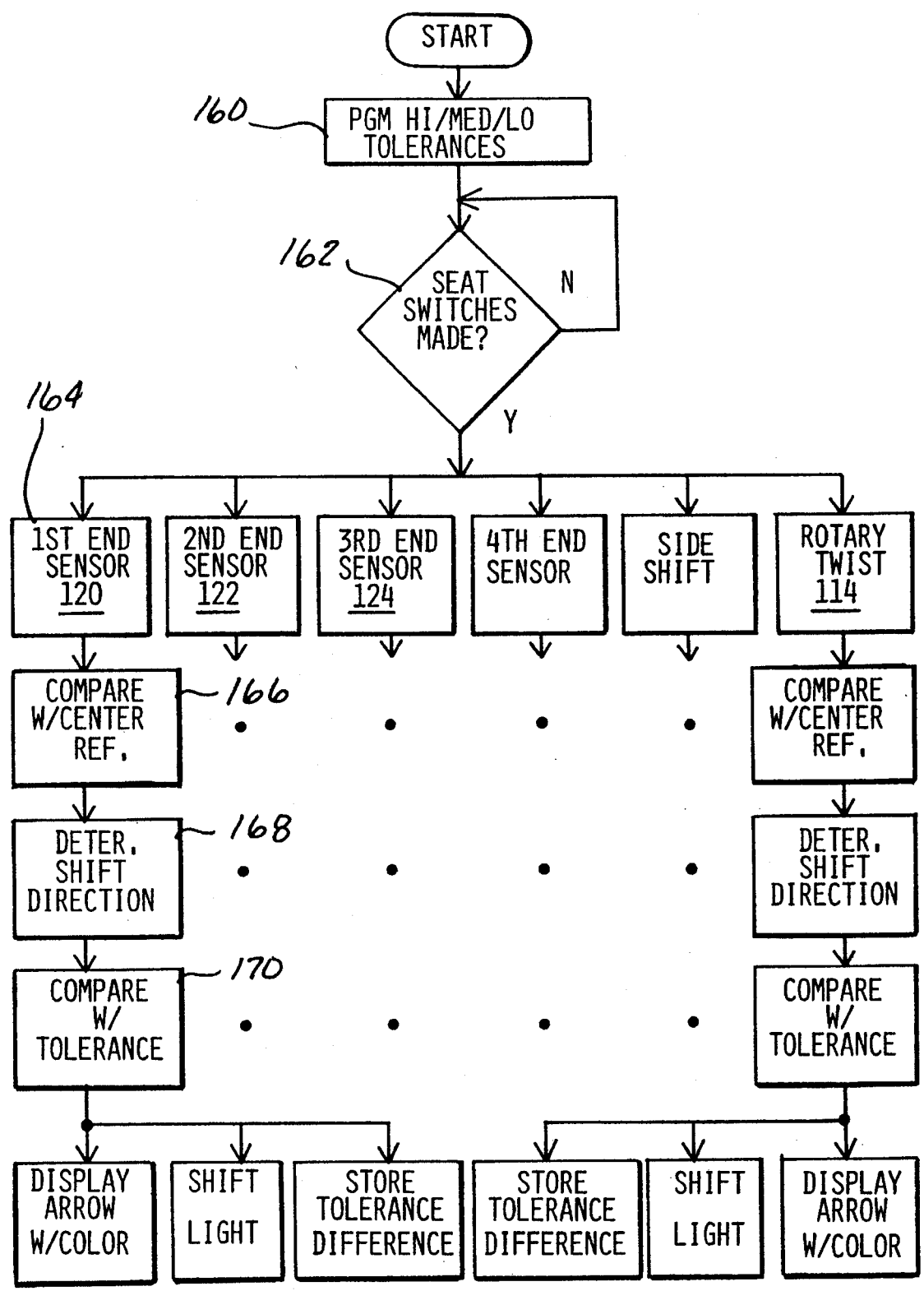
FIG. 5 is a flow chart of the control program executed by the control unit in a first embodiment of the present invention.

FIG. 5 depicts the sequence of operation of the central processing unit 150 in executing the control program stored in the memory 152. After a start command, the control program loads in step 160 from the memory 152 into an active portion thereof the preset dimensional tolerances for each of the sensors for the sand core 12. These tolerances define the maximum and minimum allowable dimensional differences from the zero reference point of the dimension measured by each sensor and have been previously entered by means of the keyboard 154. Also included, as described hereafter, is a marginal tolerance range which is still an acceptable dimension, but indicates that the measured dimensional difference is approaching an unacceptable or out-of-tolerance condition. Next, in step 162, the control program checks to determine if all of the locator transducers 40, 42, etc., have been fully made. If not, the apparatus 10 must be readjusted to place the apparatus 10 in the proper reference coordinate position on the sand core 12. Once in this position, the control program reads the inputs from the various sensors. Although the method steps for processing the signals from each of the sensors is identical and such processing is illustrated as being in parallel in FIG. 5, this is for convenience only as the central processing unit 150 sequentially processes the sensor outputs at a high instruction processing rate. The following description was provided for an analysis of the output signals from the first end sensor 120, it being understood that the central processing unit 150 and control program function in the same manner to process, compare and display data for all of the remaining sensors.

As shown in step 164, the output signals from the first end sensor L20 are input to the central processing unit 150. The central processing unit 150 then compares this signal with a zero reference signal to determine both the magnitude of a measured dimensional difference from the zero reference point as well as the direction of dimension difference, that is, left or right from the zero reference point. The zero reference point is a dimension stored in memory 152 which is the ideal measured dimension for the particular portion of the sand core 12 measured by the sensor 120. This comparison takes place in step 166 prior to determining the dimension shift direction in step 168. The measured dimensional difference is then compared with the tolerance range for the dimension measured by the sensor 120 in step 170. At this point in the control program, the central processor 150 is capable of executing one or any combination of any or all of three separate steps. When a computer video display/monitor 156, which may be any conventional video, CRT or raster scan device, is used as the indicator means, the control program, as described hereafter in the second embodiment and shown in FIG. 10, over an overlay of the sand core 12 on the display creates a dimension window for the measured dimension, such as the dimension on the sand core 12 measured by the sensor 120. The control program displays the magnitude of the measured dimensional difference with a "+" or "−" ahead of the measured numeric value as output from the sensor 120 and converted by the central processing unit 150 to a difference value from the zero reference dimension. The control program also illuminates an arrow at either end of the dimension box to indicate the direction of dimensional shift from the zero reference point or dimension. Also, the control program depicts the dimensional box in one of two and possibly three distinct colors, depending upon where the measured dimensional difference lies with respect to the predetermined range of dimensional tolerances associated with the measured dimension. For example, if the measured difference lies within acceptable tolerance range, the control program could illuminate or highlight the outline of the box in a green color. A yellow color may be used to indicate a marginal dimensional difference which, while still in the acceptable range, is approaching an unacceptable tolerance condition. A red box illustrates an out-of-tolerance measured dimension.

Figure 11:
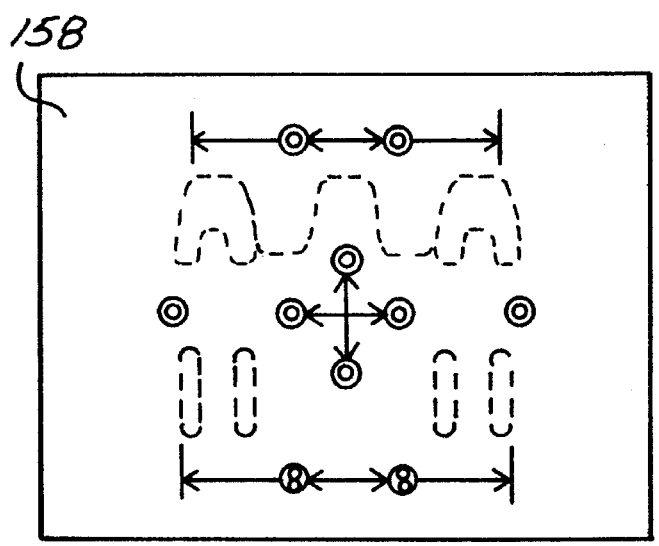
FIG. 11 is an elevational view of a light panel used in the second embodiment of the present invention.

At the same time, the control program can illuminate appropriate lights in the light panel 158 as shown in FIG. 11 for the second embodiment, it being understood that a similar light panel can be constructed for the first embodiment described herein. Such a light panel 158 is provided with a plurality of illuminatable lights, at least one and preferably two lights associated with each sensor, such as sensor 120 in this embodiment. One of the pair of lights would be colored green to indicate an acceptable measured dimension while a red light would be provided for an unacceptable measured dimension. The control program, based on the measured dimension difference from the sensor 120 and a comparison with the dimensional tolerance range for the measured dimension would illuminate the appropriate light on the light panel 158 to provide an operator with an easily visible indication of an acceptable or unacceptable sand core 12.

The control program may also activate a suitable alarm, such as a visual and/or audible alarm, in the event that any unacceptable dimension is detected. Finally, the control program stores the measured dimensional differences along with other part data, such as core number, date and time of check, etc., in the memory 152 to provide a record of each sand core 12.

This process is repeated for the remaining sensors with the control program activating the relevant portions of the display and/or light panel as well as storing the measured dimensional data for each sensor.

A second embodiment of the present invention is shown in FIGS. 6–11. In this embodiment, an apparatus 180 for checking the dimensions of a sand core includes a first frame 182 formed of a center frame leg 184 and two depending end legs 186 and 188 which are respectively joined to and extend from opposite ends of the center leg 184. Cross members 190 and 192 are joined to the opposite end of the end legs 186 and 188 and extend transverse thereto. A longitudinal connector member 194 extends between and is joined to one end of the cross members 190 and 192 by connectors 196.

Figure 7:
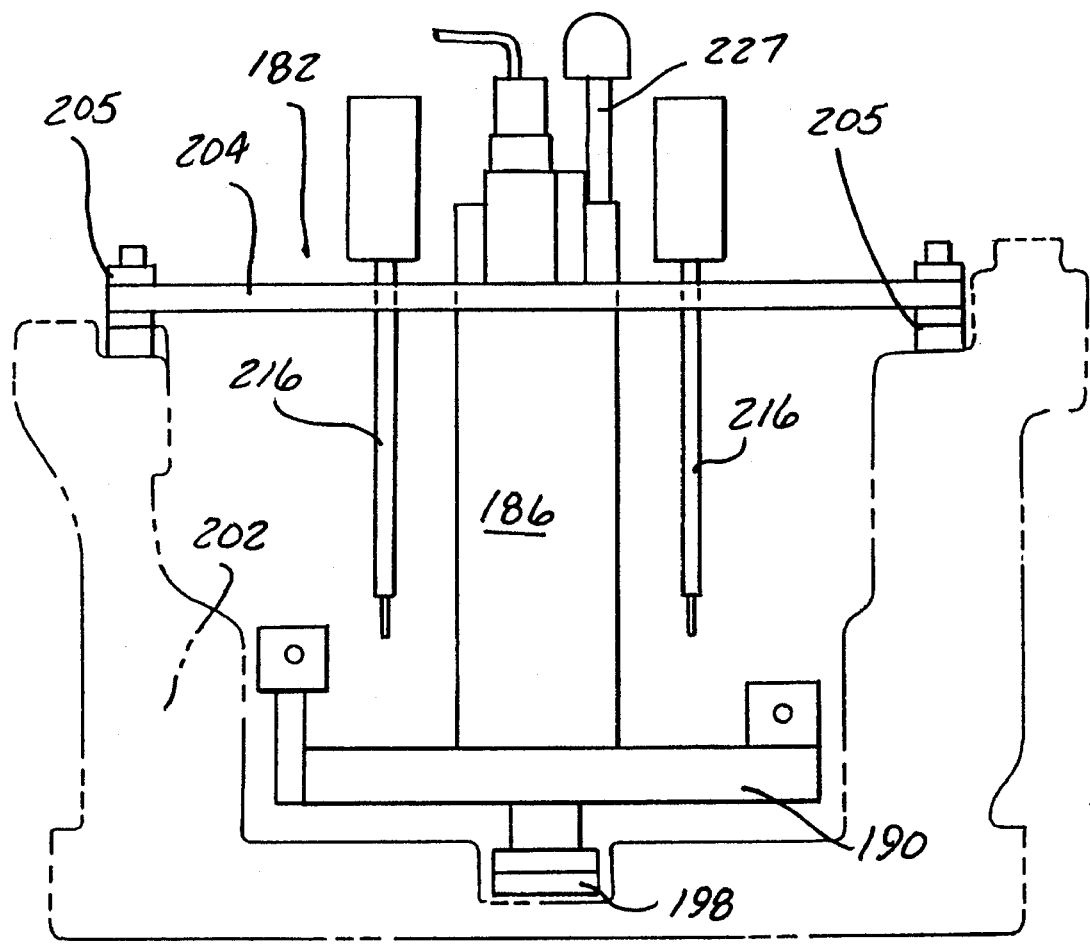
FIG. 7 is an end view of the apparatus shown in FIG. 6.
Figure 8:
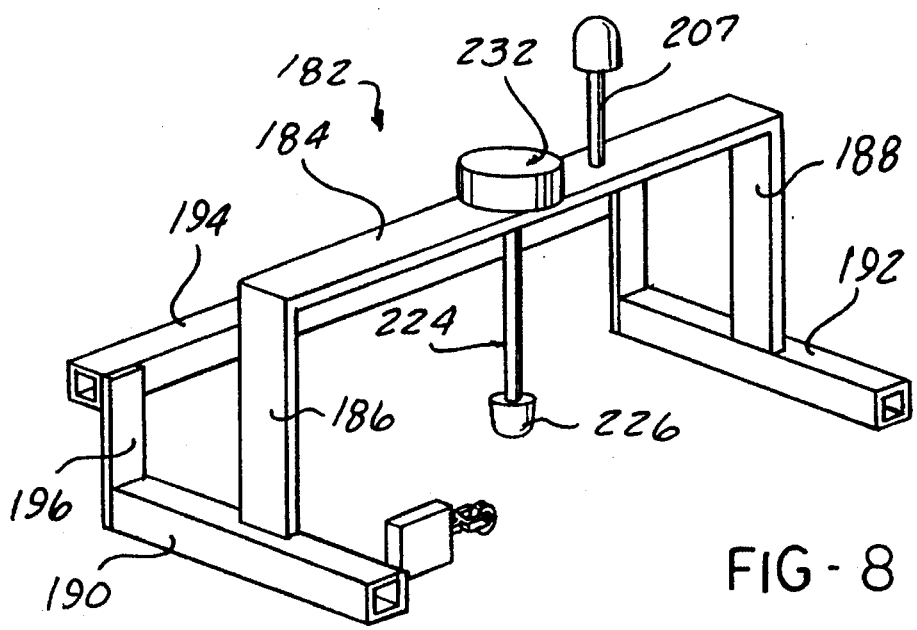
FIG. 8 is a perspective view of the frame shown in FIG. 6.

Locator members 198 and 200 are fixedly mounted to the cross members 190 and 192 and seat within notches formed on the sand core 202, shown in phantom in FIG. 7, to locate the frame 182 in a zero coordinate reference measuring position with respect to the sand core 202.

An upper cross piece 204 is fixedly joined to the center leg 184 and has a pair of additional locators 205 mounted at outer ends thereof which also seat within recesses or notches in the sand core 12 to provide transverse location of the frame 182 in the zero coordinate reference measuring position with respect to the sand core 202.

Figure 6:
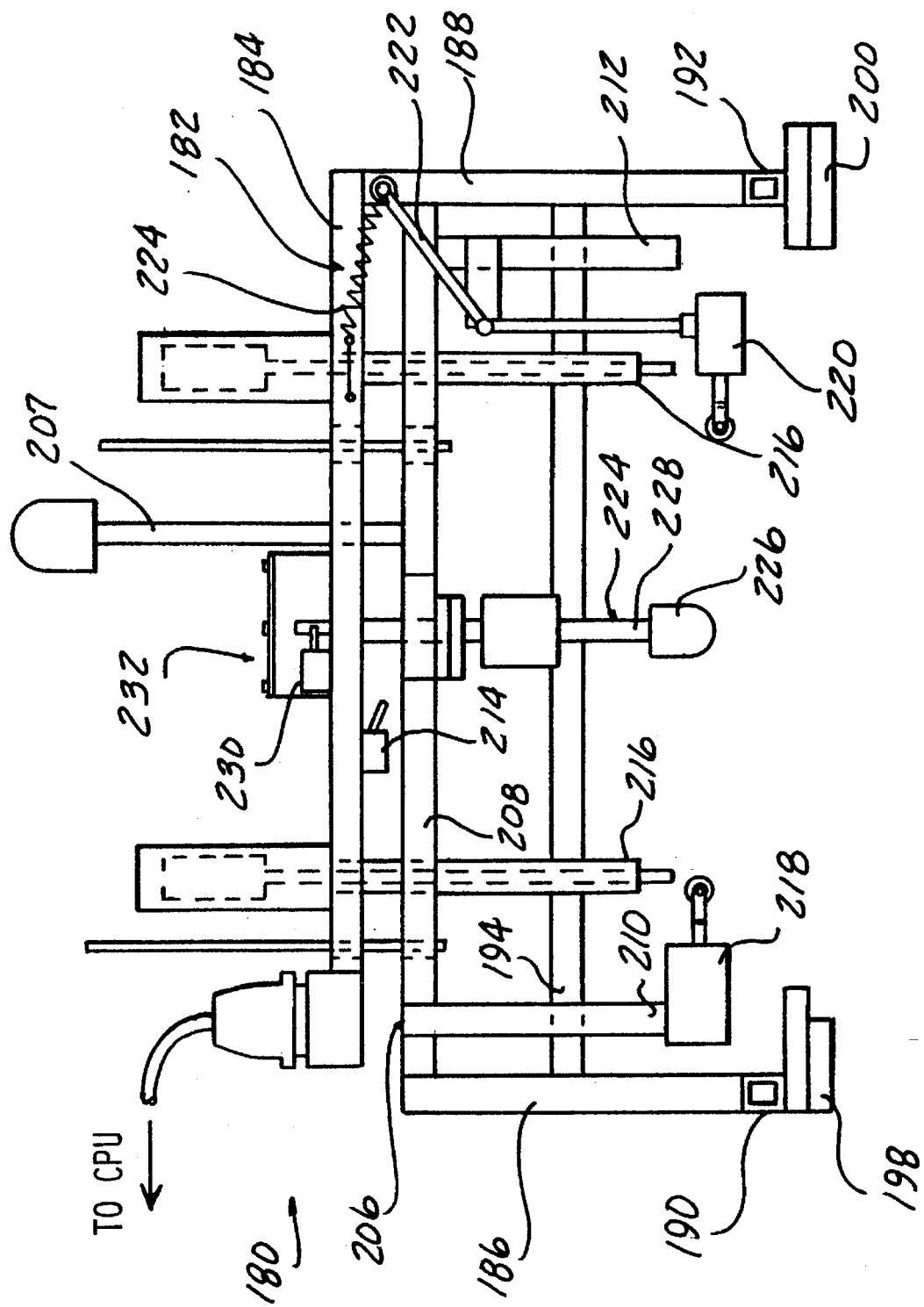
FIG. 6 is a front elevational view of a second embodiment of the apparatus of the present invention.

A movable frame 206 is movably mounted within the frame 182 and is movable from a first, normal position shown in FIG. 6 to a lowered or extended position as described hereafter. The movable frame 206 includes a center leg 208 from which two end legs 210 and 212 respectively depend.

A manual depress button 207 is connected to the leg 208 of the frame 206 and extends through the leg 184 of the frame 182 to provide a convenient means for manually lowering the movable frame 206 with respect to the frame 182.

As shown in FIG. 6, a seated actuator switch 214, which may be a conventional limit switch, is mounted on the frame leg 184 and contacts the center leg 208 of the movable frame 206 to detect when the movable frame 206 is in the first, normal position with respect to the frame 182.

A variety of sensor means are mounted on the frames 182 and 206 for measuring the dimensions of selected portions of the sand core 202. Such sensors may be linear displacement sensors as described above for sensor 120, etc., and provide an output signal proportional to the displacement of an actuator of each sensor.

As shown in FIG. 6, at least two and preferably four spaced touch sensors 216 are mounted in the leg 184 of the frame 182 and extend downward therefrom. An actuator mounted on each sensor 216 is positioned to contact an element or portion of the sand core 202 when the frame 182 is mounted in the zero coordinate measuring position on the sand core 202. The sensors 216 provide a dimensional measurement of an up/down position of selected elements or portions of the sand core 202. Such elements could include the position of the intake and exhaust manifold portions on the sand core 202.

Two additional sensors are mounted on the legs 210 and 212 of the movable frame 206. The first sensor 218 is mounted on the cross member 190 attached to the end of the leg 210 and has an actuator positioned to engage and measure the dimension of a particular element of the sand core 202 when the movable frame 206 is moved to its second, lowered position. A sensor 220 is pivotally mounted to the leg 212 of the movable frame 206 by means of a link 222 and a biasing spring 224 connected to the leg 212 of the movable frame 206 and the legs 184 and 188 of the frame 182. During the lowering of the movable frame 206, the link 222 causes the sensor 220 to pivot away from the leg 212 of the movable frame 206 into engagement with a selected element of the sand core 202.

The movable frame 206 also has a ball sensor 224 mounted substantially centrally thereon. The ball sensor 224 has a hemispherical-shaped actuator 226 mounted at one end of a shaft 228. Sensing elements 230 disposed in a housing 232 fixedly attached to the leg 184 of the frame 182 are devised to detect movement of the shaft 228 and actuator 226 along two mutually exclusive, preferably perpendicular planes, such as planes extending along an X-Y axes with respect to the center of the shaft 228. The actuator 226 engages a bore in the sand core 202 when the movable frame 206 is in its lowered position to detect the X and Y axis position of the bore in the sand core 202. The sensor 224 provides two output signals representative of the measured movement of the actuator 226 along both of the X and Y axes.

Figure 9:
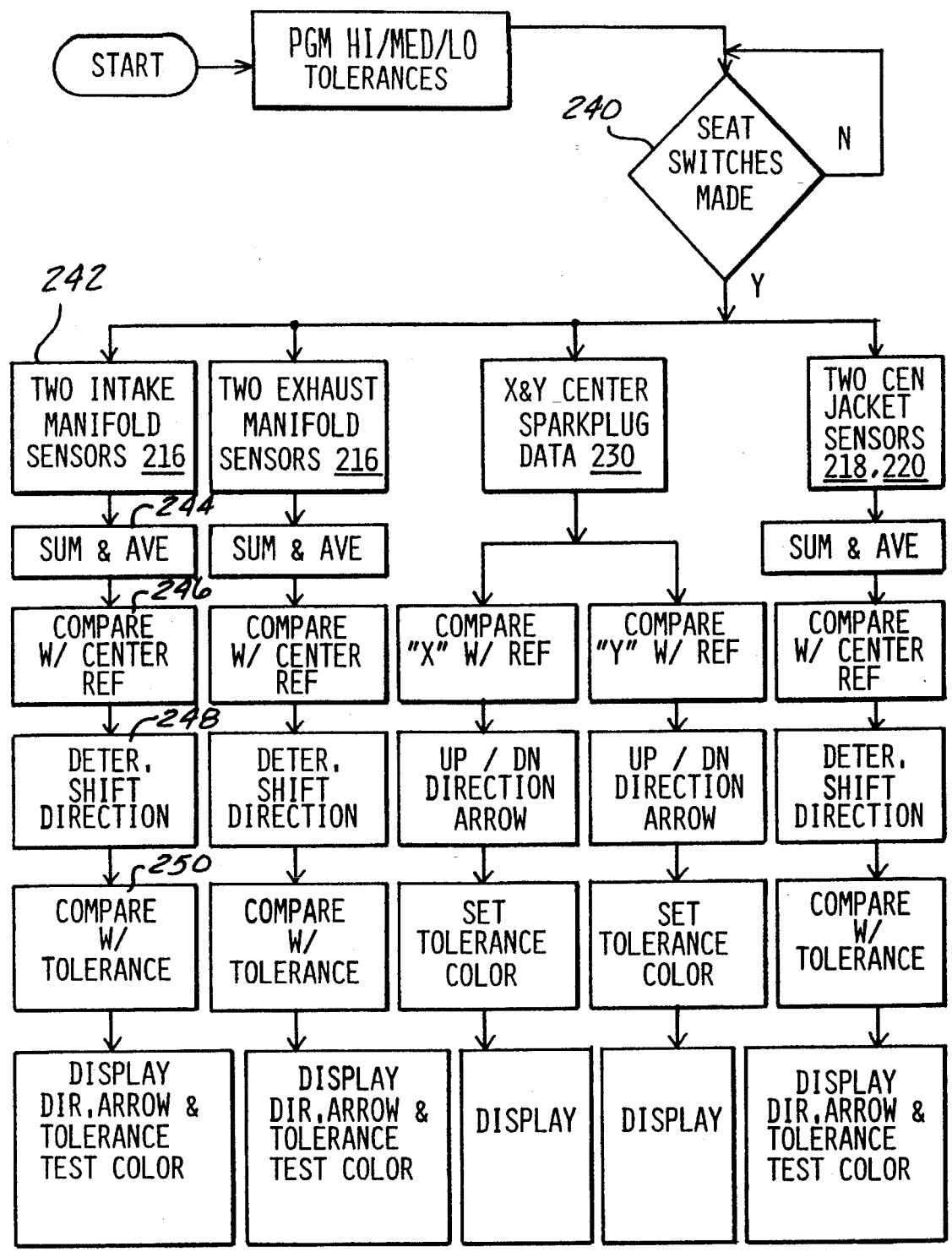
FIG. 9 is a flow chart showing the operation of the control program of the second embodiment of the present invention.

The second embodiment of the present invention employs the same control means shown in FIG. 4 and described above. In this embodiment, the central processing unit 150 also executes a stored control program, the sequence of which is depicted in FIG. 9. After a start signal, the high/medium/low tolerance dimensions are either entered manually through the keyboard 154 or are accessed in the memory. After the apparatus 180 has been seated on the sand core 202 and the movable frame 206 lowered to its sensor engaging position, as described above, the control program checks to make sure that the seated switch 214 is no longer made, as shown in step 240 in FIG. 9. Next, the outputs from the various sensors 216, 230, 218, 220, etc., are input to and read by the central processing unit 150. The following description was provided only for the processing of the signals from the sensors 216, it being understood that similar processing takes place for the other sensors, as shown in FIG. 9.

The output signals from the two sensors 216 are input in step 242 to the central processing unit 150. The magnitude of the two signals are summed in step 244 and averaged to provide a single sensor signal. This signal is compared in step 246 with the zero or center reference dimension of the respective sensors 216 to determine any difference therebetween. The direction of dimensional shift or difference is then determined in step 248. The dimensional difference is then checked with the stored dimensional tolerances in step 250 to determine if the dimension of the measured element of the sand core 202 as detected by the sensors 216 is within or without the specified dimensional tolerances. The control unit 150 then activates the appropriate display 156 and/or 158 to provide a visual indication of the measured dimension, any difference from the zero reference dimension as well as the direction of such difference. As described above, the central processing unit 150 activates a video display monitor to create a visual indication of the measured dimensions on the sand core 202, as shown in FIG. 10.

Figure 10:
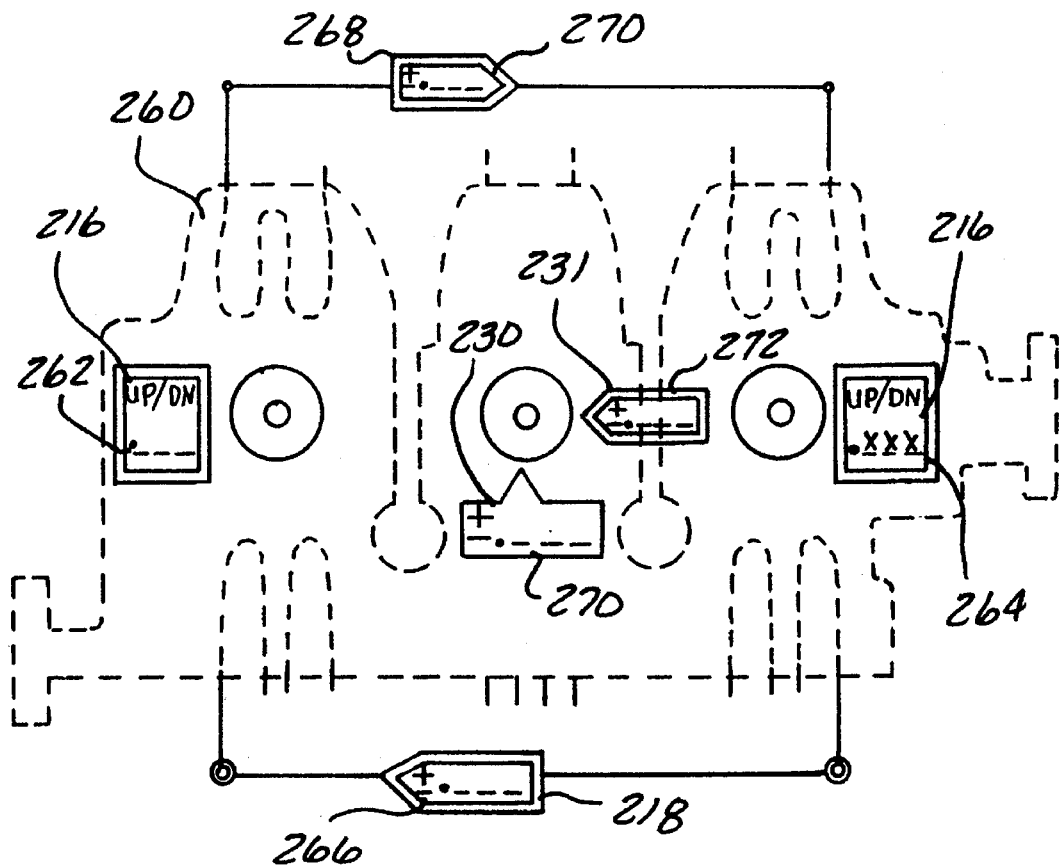
FIG. 10 is an elevational view of a computer display for the second embodiment of the present invention.

FIG. 10 depicts the visual display on the monitor 156 which provides a visual overlay 260 of the outline or shape of the sand core 202 with the measured dimensional points being identified thereon. The display includes various dimensional boxes or indications corresponding to each of the sensors 216, 218, 220, 230 and 231. The summed and averaged outputs from the sensors 216 are depicted in a dimensional box with the averaged dimensional difference measured thereby being shown in the box 262 in numeric form with a "+" or "−" symbol indicating the general direction of dimensional shift from the zero reference point for the measured dimension. The "+" and "−" symbols provide an indication of the direction of dimensional shift from the zero reference point, with a "+" symbol being highlighted to indicate an upward directional shift and the "−" symbol being highlighted or displayed to indicate a downward dimensional shift from the zero reference point. A similar dimensional box 264 is provided for the other pair of sensors 216. Additional dimensional boxes 266 and 268 are provided for displaying the numeric value of the measured dimensional differences from the sensors 218 and 220. The X and Y axis data from the sensor 224 are displayed in dimensional boxes 270 and 272.

The central processing unit or CPU 150, besides providing a numeric value of each measured dimension, also is capable of highlighting each dimensional box 262, 264, etc., in one of a variety of different colors to indicate an acceptable, unacceptable or marginal dimension as compared with the preset dimensional tolerance range for the measured dimension. As noted above in the first embodiment, a green highlight color would indicate an acceptable measured dimension, a red color would indicate an unacceptable measured dimension and a yellow color indicative of a marginal, but still acceptable measured dimension. Certain of the dimensional boxes 262 and 264 may also be provided with arrows at one end to indicate the direction of dimensional shift with respect to the zero reference point or dimension for each measured dimension.

FIG. 11 depicts an example of the light panel 158 which may be used by itself or in conjunction with the monitor 156. The light panel 158 includes a housing having a number of individually illuminatable lights mounted thereon, preferably in a position corresponding to the mounting position of the sensors on an outline of the sand core 202, as shown in FIG. 11. At least one light, and preferably a plurality of lights are provided for each sensor to provide an acceptable/unacceptable indication of the measured dimensional difference as described above. The lights may be colored in green or red to provide the desired acceptable or unacceptable measured dimension indication.

As in the first embodiment, the CPU 150 also stores the measured dimensional differences along with additional information, such as date, time, core part number, etc., and is also capable of transmitting such data to other devices for data storage, processing, printout, etc.

What is claimed is:

1. In combination with a sand core formed of a plurality of interconnected sand core elements, a sand core dimension checking apparatus comprising:

a frame;

means, mounted on the frame, for locating the frame with respect to a coordinate reference position on the sand core;

a plurality of sensors mounted on the frame and contacting the sand core, each sensor providing an electrical signal indicative of a distinct measured dimension of the sand core;

control means, responsive to signals from the sensors, for comparing the measured dimension of the sand core measured by each sensor with respect to a respective zero reference dimension and a predetermined dimensional tolerance for each measured dimension; and indicator means, responsive to the control means, for indicating an acceptable/unacceptable condition of each measured dimension of the sand core.

2. The combination of claim 1 wherein:

the control means is operative to determine the direction of dimensional difference of each measured dimension with respect to the zero reference dimension for each measured dimension;

the indicator means being responsive to the control means for visually indicating the direction of dimensional difference of each measured dimension from the zero reference dimension.

3. The combination of claim 1 wherein the indicator means comprises:

a display monitor, responsive to the control means, for displaying numeric values of the dimensional difference of each measured dimension from the corresponding zero reference dimension for each sensor.

4. The combination of claim 3 wherein:

the control means is operative to illuminate indicia on the display monitor with distinct colors corresponding to acceptable and unacceptable measured dimensions with respect to the dimensional tolerance for each measured dimension of the sand core.

5. The combination of claim 1 wherein the indicator means comprises:

a light panel including a plurality of individual illuminatable lights mounted in a housing, at least one light corresponding to each measured dimension of the sand core.

6. The combination of claim 5 wherein:

two lights correspond to each measured dimension, one light indicating an acceptable measured dimension and a second light indicating an unacceptable measured dimension with respect to the dimensional tolerance for each measured dimension of the sand core.

7. The combination of claim 1 further comprising:

alarm means, activated by the control means, for providing at least one of a visual and audible alarm when any one measured dimension is beyond the respective dimension tolerance range.

8. The combination of claim 1 wherein the frame comprises:

a central leg and one end leg connected to an end of the central leg;

locator means, mounted on at least one end of the one end leg, for engaging and locating the frame with respect to the sand core.

9. The combination of claim 8 further comprising:

means, mounted in the locator means, for generating an electrical signal indicative of contact with the sand core.

10. The combination of claim 8 wherein the frame further comprises:

a second end leg;

means, mounted on the frame, for rotatably attaching the second end leg to the frame;

other locator means mounted on the second end leg for engaging and locating the sand core; and the plurality of sensors including a first sensor, mounted on the frame and responsive to rotation of the rotatably attaching means, for generating an electrical signal proportional to the degree of rotation of the rotatably attaching means from a zero reference position.

11. The combination of claim 10 wherein the rotatably attaching means comprises:

a bracket;

a shaft rotatably mounted in the bracket; and the second end leg fixedly connected to the shaft.

12. The combination of claim 11 further comprising:

means for slidably mounting the bracket on the central leg of the frame for transverse sliding movement of the bracket, and the shaft and the second end leg mounted thereon, with respect to the frame as the other locator means engages the sand core.

13. The combination of claim 12 wherein the plurality of sensors further comprise:

a second sensor, coupled between the bracket and the central leg of the frame, for sensing and generating an output signal proportional to the amount of transverse movement of the bracket with respect to a zero reference position on the frame.

14. The combination of claim 8 further comprising:

an extensible and retractable sensor frame movably mounted on the central leg of the frame; and means, mounted on the frame, for extending and retracting the sensor frame;

the plurality of sensors including at least one sensor mounted on the sensor frame and engaging the sand core and generating an output signal proportional to the dimension of the engaged portion of the sand core with respect to a zero reference dimension.

15. The combination of claim 14 wherein the plurality of sensors further comprise:

one sensor mounted along the longitudinal axis of the frame and two sensors spaced from the longitudinal axis on an end member of the sensor frame.

16. In combination with a sand core formed of a plurality of interconnected sand core elements, certain core elements having locator points, a sand core dimension checking apparatus comprising:

a frame having first and second ends;

means, mounted on the frame, for locating at least one of the first and second ends of the frame with respect to a coordinate reference position on the sand core;

a plurality of sensors, each mounted on the frame and for contacting the sand core each sensor providing an electrical signal indicative of a measured dimension of the sand core;

control means, responsive to signals from the sensors, for comparing the measured dimension measured by each sensor with respect to a respective zero reference dimension for each measured dimension and acceptable dimensional tolerances for each measured dimension;

indicator means, responsive to the control means, for indicating an acceptable/unacceptable measured dimension of the sand core;

the control means being operative to determine the direction of dimensional difference of each measured dimension measured by each sensor with respect to the respective zero reference dimension;

the indicator means being responsive to the control means for visually indicating the direction of dimensional difference of each measured dimension from the respective zero reference dimension; and a video display monitor, responsive to the control means, for displaying numeric values of the measured dimensional differences from the zero reference dimension measured by each of the sensors.

17. The combination of claim 16 wherein:

the frame includes a first frame having a central leg and two depending end legs connected to opposite ends of the central leg;

the locating means is mounted on the end legs for engaging the sand core and locating the first frame with respect to the sand core in a predetermined coordinate reference position;

the plurality of sensors including a first sensor mounted on the first frame and engaging a selected portion of the sand core and generating an electrical signal indicative of the measured dimension of the engaged portion of the sand core;

a second frame movably mounted within the first frame and manually lowerable from a first normal position to a second position; and the plurality of sensors further including a second sensor, mounted on the second frame, for engaging a selected portion of the sand core and generating an electrical signal indicative of the difference of a measured dimension of the sand core from a respective zero reference dimension when the second frame is moved to the second position.

18. The combination of claim 16 wherein the plurality of sensors further comprises:

a third sensor mounted on the frame and engaging a bore in the sand core, the third sensor generating two signals proportional to two mutually exclusive axes of the position of the bore with respect to a zero bore reference position.

* * * * *